UNITED STATES PATENT OFFICE.

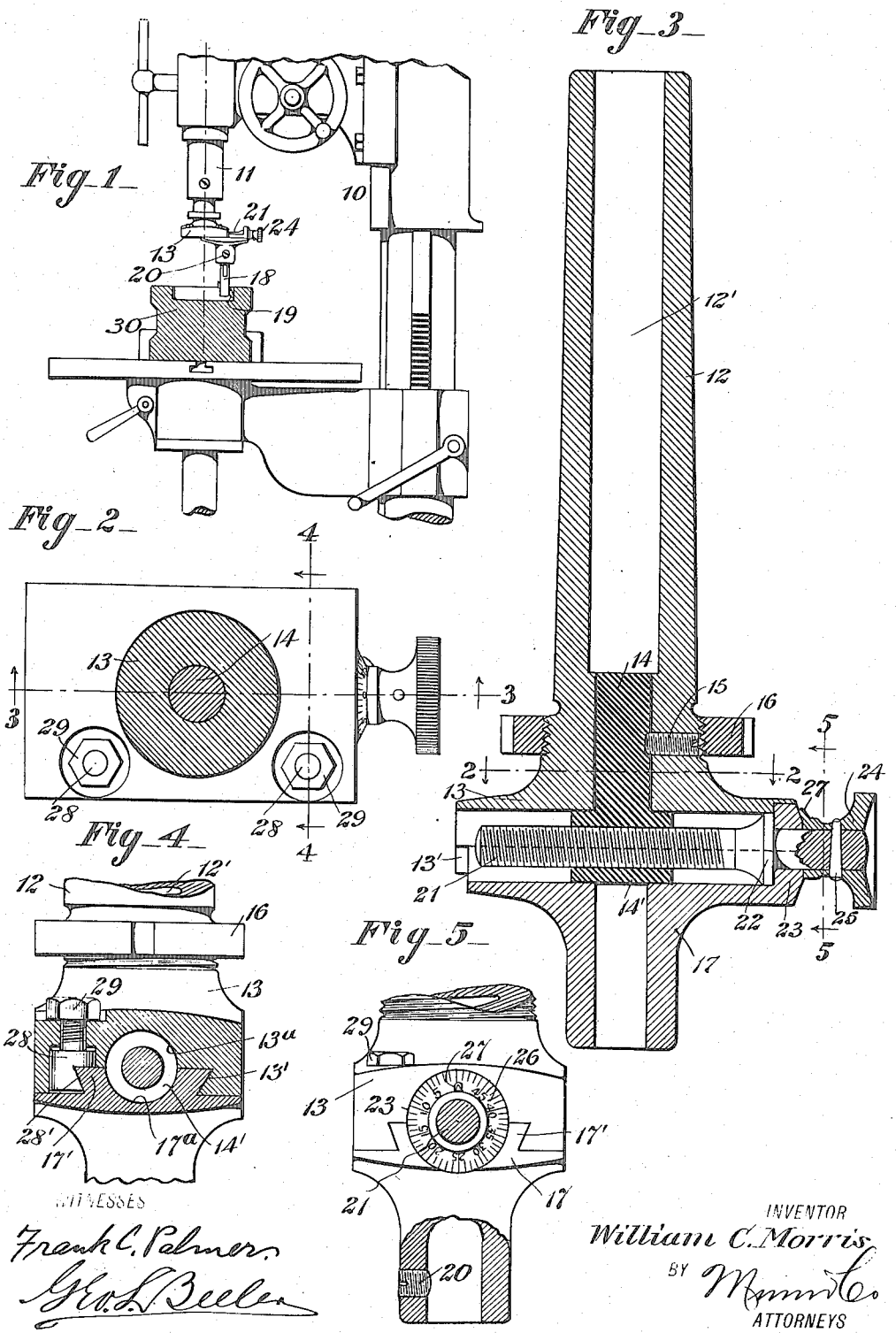

WILLIAM C. MORRIS, OF EASTON, PENNSYLVANIA.

ADJUSTABLE BORING-TOOL HOLDER.

1,133,169.  Specification of Letters Patent.  Patented Mar. 23, 1915.

Application filed February 3, 1914. Serial No. 816,239.

*To all whom it may concern:*

Be it known that I, WILLIAM C. MORRIS, a citizen of the United States, and a resident of Easton, in the county of Northampton and State of Pennsylvania, have invented a new and Improved Adjustable Boring-Tool Holder, of which the following is a full, clear, and exact description.

This invention relates to metal working machinery and has particular reference to holders for boring tools.

Among the objects of the invention is to provide a holder for a boring tool providing for delicate and accurate adjustments for various purposes, including the facilities for resetting a tool to the precise position in which it may have been set previously, and also to provide precise degrees of adjustment for the boring tool for jig work purposes.

A further object of the invention is to provide improved facilities for locking the several parts in adjusted position, all of the adjustments and manipulations of the device being performed in an easy, quick and reliable manner.

The foregoing and other objects of the invention will hereinafter be more fully described and claimed and illustrated in the drawings forming a part of this specification in which like characters of reference indicate corresponding parts in all the views, and in which—

Figure 1 is a front elevation of a portion of a boring machine indicating my improvement in use; Fig. 2 is a transverse section on the line 2—2 of Fig. 3; Fig. 3 is a vertical section on the line 3—3 of Fig. 2; Fig. 4 is a transverse section on the line 4—4 of Fig. 2; and Fig. 5 is a vertical view, partly in section, on the line 5—5 of Fig. 3.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring to the drawings for a more specific description of the invention, I show at 10 a fragment of a machine including a rotary spindle 11 into which is set or fitted the shank 12 of a tool holder head 13. The said shank is preferably made hollow, as indicated at 12', to reduce its weight, and into the lower end of said cavity is fitted an adjustment screw nut stem 14, said nut being held in place by a headless screw 15. A collar 16 is carried by the head 13 and serves for the purpose of removing the head from the spindle. The lower surface or end of the head 13 is dovetailed, as shown at 13', and is also provided with a semi-cylindrical groove 13ª into which the cylindrical head 14' of said adjustment screw nut is located.

At 17 I provide a boring bar holder adapted to be fitted into or against the lower surface of the head 13 and having a tongue 17' fitted snugly and slidably in the dovetail 13' of the head. Said bar holder is also provided with a semi-cylindrical groove 17ª complemental to the groove 13ª above described, as shown especially in Figs. 3 and 4.

From what has just been stated, it will be understood that the holder 17 is moved in right lines at right angles to the axis of the tool holder head, it being confined to such movements by means of the tongue and dovetail of the respective parts.

A boring bar 18 of any suitable size, form or construction and adapted to carry a cutting tool 19 is adapted to be secured in the boring bar holder 17 as by means of a headless set screw 20. Any suitable means may be provided to effect the adjustment of the bar holder in the manner above described and control its position with respect to the tool holder head. The means I prefer to employ for this purpose includes a screw 21 having, say, twenty threads per inch, and coöperating directly with the nut 14. The axis of the screw coincides with the axis of the grooves 13ª and 17ª above described. Said set screw has a shoulder 22 lying in the normal or innermost position within the grooves of the bar holder and abutting against a bearing lug 23 of the bar holder. A head 24 or knob is keyed as by means of a pin 25 to the outer end of the screw, and thereby the screw is fixed to the bar holder in such a manner as to be held from longitudinal movement therein. The outer surface of the bearing lug 23 is preferably provided with a graduated scale 26 indicating in this instance fifty subdivisions incident to each rotation of the screw. A pointer 27 is carried by the head 24 and coöperates with said scale. It will be seen, therefore, that in a device made in accordance with the above description, a rotation of the screw from one scale point to another will cause the adjustment of the bar holder through exactly one-thousandth of an inch, or for each full rotation of the screw 21 the bar holder will be moved with respect to the nut 14 through one-twentieth of an inch.

As a convenient and reliable means for locking the bar holder 17 in adjusted position in connection with the screw 21, I provide one or more locking screws 28 having peculiarly shaped heads countersunk within the lower portion of the head 13 and having undercut notches 28' in alinement with and corresponding to the shape of the dovetail of said head. By tightening the bolts 28, by any suitable wrench, the heads of the bolts will tightly grip and wedge the tongue 17' of the bar holder, whereby the screw 21 will be relieved from the strain incident to the operation of the cutting or boring tool.

It will be understood from the foregoing description, and in connection with Fig. 1, that if the job 30 is to have its cavity enlarged, the adjustment of the tool holder may be effected simply by loosening the nuts 29 and then turning the adjustment screw 21 toward the left or counter-clockwise, as viewed in Fig. 5, through as many thousandths as desired and as indicated by the scale.

Having thus described my invention, I claim as new and desire to secure by Letters Patent:—

In a device of the character set forth, the combination of a head adapted to be secured in fixed position, said head having a dovetail groove extending at right angles to the axis of the head, a boring bar holder movable in right lines along said dovetail and having a tongue extending thereinto, means to move the bar holder in graduated amounts, and means to lock the bar holder in adjusted position, said locking means including a bolt 28 having a head countersunk in said first mentioned head, the head of the bolt having a notch 28' conforming to and in alinement with the dovetail groove and receiving the bar holder tongue, and means to tighten the bolt to cause the bar holder tongue to bind in the dovetail groove.

In testimony whereof I have signed my name to this specification in the presence of two subscribing witnesses.

WILLIAM C. MORRIS.

Witnesses:
GEORGE W. RUSTAY,
GERTRUDE E. MORRIS.